United States Patent [19]
Eckardt et al.

[11] Patent Number: 5,962,623
[45] Date of Patent: Oct. 5, 1999

[54] PROCESS FOR THE PREPARATION OF POLYACETAL COPOLYMERS

[75] Inventors: Peter Eckardt, Hofheim, Germany; Michael Hoffmockel, Corpus Christi, Tex.; Karl-Friedrich Mück, Weisbaden, Germany; Gerhard Reuschel, Liederbach, Germany; Satyajit Verma, Corpus Christi; Michael G. Yearwood, Bishop Nueces, both of Tex.

[73] Assignee: Ticona GmbH, Germany

[21] Appl. No.: 09/149,581

[22] Filed: Sep. 8, 1998

[51] Int. Cl.[6] ...................................................... C08G 4/00
[52] U.S. Cl. ........................ 528/232; 528/242; 528/248; 528/249; 524/745; 524/755; 524/757
[58] Field of Search ................... 528/232, 242, 528/248, 249; 524/745, 755, 757

[56] References Cited

U.S. PATENT DOCUMENTS

| | | | |
|---|---|---|---|
| 4,431,794 | 2/1984 | Sadlowski et al. | 528/232 |
| 4,808,689 | 2/1989 | Katz | 528/48 |
| 4,925,503 | 5/1990 | Canterberry et al. | 149/19.4 |
| 4,975,520 | 12/1990 | Collins | 528/232 |
| 5,144,005 | 9/1992 | Sextro et al. | 528/480 |
| 5,288,840 | 2/1994 | Morishita et al. | 528/238 |
| 5,587,449 | 12/1996 | Fleischer et al. | 528/232 |

*Primary Examiner*—Samuel A. Acquah
*Attorney, Agent, or Firm*—Connolly & Hutz

[57] ABSTRACT

A continuous process for the preparation of polyacetal copolymers from 1,3,5-trioxane and the comonomers known for this purpose using strong protic acids as an initiator, in which the initiator is added in an amount of 0.01 to 0.6 ppm, based on the total amount of monomers, in finely divided form to the monomer mixture, after the polymerization step the crude polymer is transferred from the polymerization reactor to a mixing unit without further intermediate steps, excess monomer is removed from the crude polymer in the mixing unit or between polymerization reactor and mixing unit by applying reduced pressure and, if desired, generally customary stabilizers, assistants, fillers, reinforcing materials and/or colorants are incorporated into the polymer in the mixing unit.

13 Claims, 1 Drawing Sheet

PROCESS FOR THE PREPARATION OF POLYACETAL COPOLYMERS

The present invention relates to a process for the continuous preparation of polyacetal copolymers from trioxane with comonomers known for this purpose, in which the initiators used are strong protic acids which are added in finely divided form to the monomer mixture, and in which, immediately after the polymerization step, the crude polymer is transferred directly, i.e. without the use of deactivators, to a mixing unit in which further additives are incorporated into the polymer. The material prepared in this manner has excellent stability.

Polyacetal copolymers have been known for many years and have proven useful as material in a variety of applications. Since their market launch about 30 years ago, in particular polyacetal copolymers based on polyoxymethylene (POM) have become established as extremely useful industrial materials in many applications. The POM copolymer is widely used, especially as the construction material in automotive construction and in the electrical industry. Examples of this are to be found in the application brochures of the polyacetal producers.

After the polymerization step, polyoxymethylene copolymers in the form of crude polymers have insufficient stability and are therefore usually subjected to particular working-up steps before they are mixed with stabilizers and assistants in a further step, usually with the use of a granulating extruder, and are thus brought into the commercial state.

The process steps for working up the crude polymers are known to include:

a) the deactivation of initiators
b) the elimination of unstable chain ends
c) the removal of unconverted monomers
d) the incorporation of stabilizers and assistants.

There are many known industrial processes which combine these steps for the preparation of polyacetal copolymers (Sabel et al. in Becker/Braun (Editors), Kunststoffhandbuch [Plastics Manual] Volume 3/1, 1992). Common to all known processes is the fact that cationic initiators are used for the preparation of copolymers of 1,3,5-trioxane. It is also generally known that the cationic polymerization does not involve any true termination reaction in which the active center is irreversibly destroyed (cf. Elias H-G., MakromolekCile [Macromolecules], Huthig and Wepf Verlag, 4th Edition, page 513 et seq. and Penzek et al., Cationic Ring Opening Polymerization in: Advances in Polymer Science No. 68/69, page 122).

This is important precisely for the copolymerization of trioxane since living, i.e. non-deactivated, chain ends and unconverted radicals of the initiators may decompose the polymer during the further processing. All known preparation processes therefore include a step in which the remaining amount of initiator is deactivated after the polymerization. The considerable complication of this procedure greatly increases the costs of the preparation.

Thus, it is known that the deactivation of the initiator is carried out in the aqueous phase or in an organic solvent, subsequent filtration, washing and drying steps being required. The deactivation of the initiator with the addition of different deactivators can also be effected in the melt (DE 3703790). The deactivation step is often carried out in combination with the demonomerization and the elimination of unstable chain ends (DE 37 38 632 and EP 0 137 305). EP 0673 955 describes a process in which crude polymer is treated with a steam stream which also contains small amounts of volatile base. In this way, unconverted residual monomer is removed and the initiator is deactivated. JP 05059255 states that the initiator is deactivated by adding alkali metal or alkaline earth metal oxides to the polymer melt.

The elimination of unstable terminal groups, which usually remain in the crude polymer after the polymerization and in particular lead to chain degradation when the polymer is heated, is also a usual process step in the preparation of POM copolymers. Hydrolysis, in which the crude polymer is dissolved in a solvent under elevated pressure at elevated temperature, is often used for this purpose. After the hydrolysis, the polymer must then be precipitated again, washed and dried.

This shows that all processes known to date entail considerable effort which serves only to remove unstable terminal groups and residual monomers, to deactivate initiators or their reaction products and to work up the results of undesired secondary reactions.

The object is therefore to develop a process which makes it possible economically to prepare stable copolymers of 1,3,5-trioxane in a continuous process while avoiding the deficiencies of the known processes.

The object is achieved if strong protic acids are used as initiator and are added in finely divided form to the monomer mixture and if, after the polymerization step, the polymer is transferred without intermediate steps from the polymerization reactor to a mixing unit in which the material is melted, the conventional additives and assistants are added and the material is thus brought into a form suitable for sale.

The invention thus relates to a continuous process for the preparation of polyacetal copolymers from 1,3,5-trioxane and the comonomers known for this purpose using a strong protic acid as an initiator, in which the initiator is added in an amount of from 0.01 to 0.6 ppm, based on the total amount of monomers, in finely divided form to the liquid monomer mixture, the crude polymer is transferred from the polymerization reactor directly to a mixing unit immediately after the polymerization step without further intermediate steps, excess monomer is removed from the crude polymer in the mixing unit or between the polymerization reactor and mixing unit by applying reduced pressure and, if desired, generally customary stabilizers, assistants, fillers, reinforcing materials and/or colorants are incorporated into the polymer in the mixing unit.

The advantages of the process according to the invention are that neither a process step for deactivation of initiators nor a separate process step for the elimination of unstable terminal groups is required in the entire process sequence. Thus, two process steps customary to date are saved by the process, with the result that POM preparation is more economical.

That POM copolymers no longer have to be treated with deactivators after the polymerization step before they can be granulated with the addition of the stabilizers and assistants customary to date was surprising and overcomes a prejudice which has existed to date. In particular, it is surprising that the POM copolymers obtained without the addition of deactivators and without additional hydrolysis nevertheless have a very high stability.

According to the invention, strong protic acids are used as initiators, it being possible in principle to use all strong protic acids. Heteropoly acids, perchloric acids or perfluoroalkanesulfonic acids are particularly suitable, trifluoromethanesulfonic acid being preferred. The concentration of the initiators is generally in the range from 0.01 to 0.6 ppm, preferably in the range from 0.03 to 0.4 ppm, and particularly preferably in the range from 0.05 to 0.19 ppm, based in each case on the monomer mixture. It is essential for the process according to the invention that the initiator be added in finely divided form to the monomer mixture comprising trioxane and the comonomers.

This is advantageously done by dissolving the initiator in a solvent which is selected from the group consisting of aliphatic ethers, such as ethylene glycol dimethyl ether or diethylene glycol dimethyl ether, aliphatic acetals, such as formaldehyde dialkyl acetals, cyclic acetals, such as 1,3-dioxolane, or cycloaliphatic ethers, such as 1,6-dioxane. Surprisingly, cyclic acetals and formaldehyde dialkyl acetals having 3 to 9, preferably 3 to 5 carbon atoms, for example formaldehyde dimethyl acetal, formaldehyde diethyl acetal, formaldehyde dipropyl acetal und formaldehyde dibutyl acetal, are particularly suitable. The weight ratio of initiator to solvent is usually 1:100 to 1:100,000, preferably 1:500 to 1:10,000. When formaldehyde dialkyl acetals are used as a solvent for the initiator, the amount of solvent is preferably 3.4 to 34 mmol per kg of monomer mixture.

Suitable comonomers for the preparation of the POM copolymers are compounds which are copolymerizable with 1,3,5-trioxane. Cyclic acetals, preferably formals, having 5 to 11, preferably 5 to 8, ring members are preferred. Suitable cyclic acetals are in particular cyclic formals of aliphatic or cycloaliphatic a, diols having 2 to 8, preferably 2, 3 or 4, carbon atoms, whose carbon chain may be interrupted by an oxygen atom at intervals of 2 carbon atoms. In addition, cyclic ethers having 3 to 5, preferably 3, ring members may also be used. The cyclic ethers may be substituted by aliphatic or aromatic radicals. The comonomers may be used, either individually or in combination, in an amount of 0.01 to 20% by weight, preferably 0.1 to 10% by weight, in particular 1 to 7% by weight, based in each case on the monomer mixture, the stated mass fraction in % by weight corresponding to the sum of the amounts of all comonomers used.

Substances which are known to act as molar mass regulators may also be added to the monomer mixture. In particular, formaldehyde dialkyl acetals having 3 to 9, preferably 3 to 5, carbon atoms, e.g. formaldehyde dimethyl acetal, formaldehyde diethyl acetal, formaldehyde dipropyl acetal and formaldehyde dibutyl acetal, are especially suitable for this purpose. The regulator is used in general in an amount of up to 2% by weight (=20,000 ppm), preferably 0.1 to 1.5% by weight, particularly preferably 0.3 to 1.2% by weight, based on the monomer mixture.

All continuously conveying and mixing units can be used as polymerization reactors. The use of twin-screw extruders is advantageous. In a preferred embodiment, shown in FIG. 1, the polymerization takes place in such a polymerization reactor (1) at melt temperatures above 65° C., the initially liquid reaction mixture which contains the molten monomers, the initiator and optionally the regulator solidifies during the polymerization to give a hard material which leaves the polymerization reactor (1) in the form of small particles via a drop shaft (5) in which reduced pressure prevails. As a result of the reduced pressure, unconverted monomers are removed from the polymer and then either fed to separate working-up or completely condensed and are recycled to upstream of the polymerization reactor. The polymer leaving the polymerization reactor falls, without further intermediate steps, directly into another continuously conveying and mixing unit (6), which is preferably likewise a twin-screw extruder. In this unit, the polymer is melted, mixed with the conventional stabilizers and assistants and brought into the commercial form.

BRIEF DESCRIPTION OF DRAWINGS

The designations in FIG. 1 have the following meanings:
1: polymerization reactor
2: feed of trioxane and comonomers
3: feed of the initiator dissolved in a solvent and optionally of the regulator
4: removal of unconverted monomers
5: drop shaft for the crude polymer
6: continuously conveying and mixing unit
7: feed of stabilizers and assistants
8: product in commercial form It is also possible to carry out all process steps in a single unit or to use a combination of more than two interconnected units. In each case, however, residual monomer is removed from the crude polymer between the polymerization zone and the addition of stabilizers and assistants by applying reduced pressure.

Antioxidants, acid acceptors, lubricants, waxes, UV stabilizers, nitrogen-containing costabilizers and other products known as stabilizers for POM may be used as stabilizers and assistants, either individually or in combination.

Figure 1:
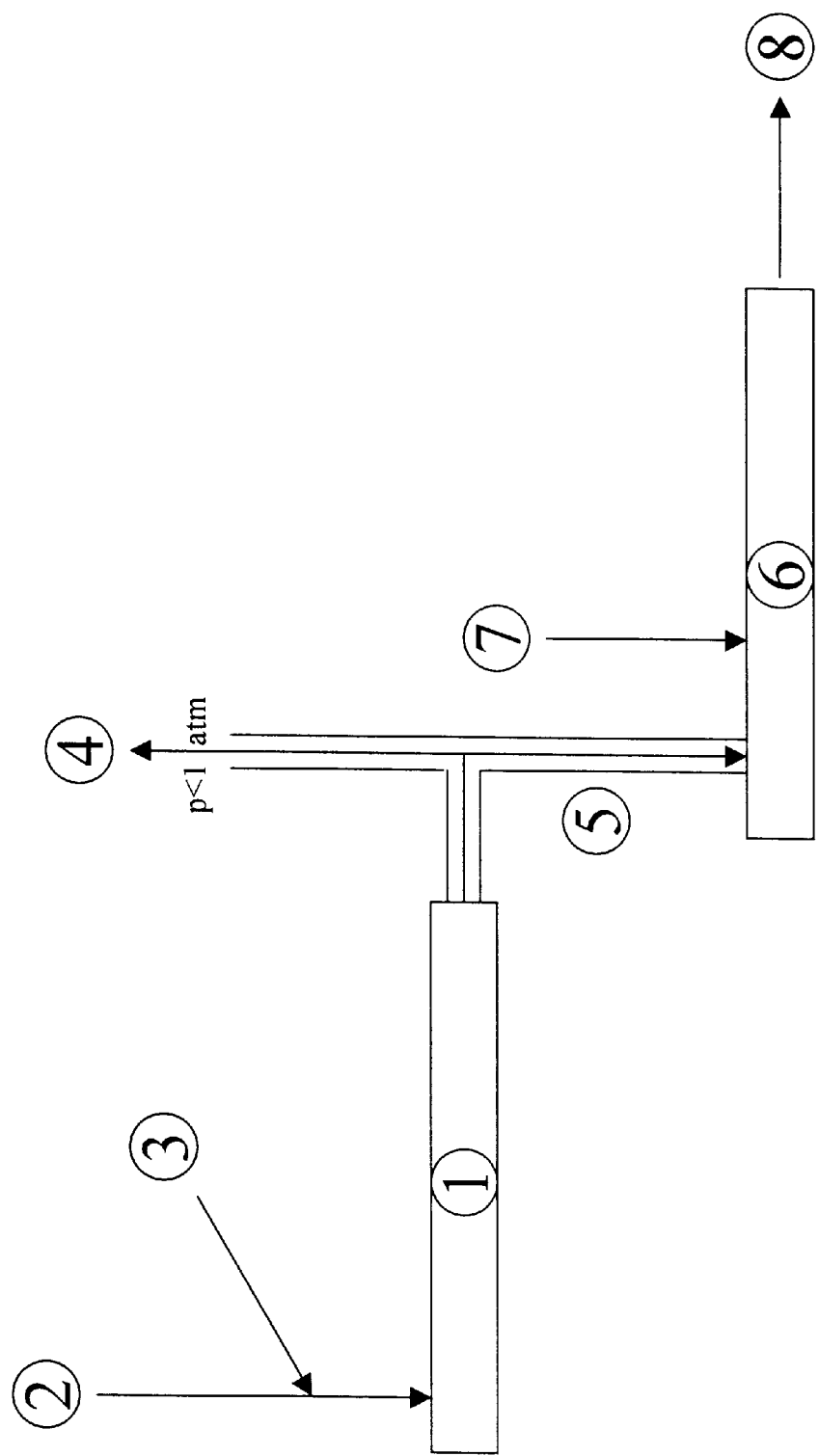

All fillers and reinforcing materials customary and known for plastics, in particular polyacetal copolymers, may be used as fillers and reinforcing materials.

EXAMPLES

Example 1

A molten monomer mixture comprising 97% by weight of trioxane and 3% by weight of dioxolane was fed at a rate of 3 kg/h to a twin-screw extruder used as a polymerization reactor. 0.15 ppm, based on the monomer mixture, of trifluoromethanesulfonic acid dissolved in 1,6-dioxane and 1050 ppm, based on the monomer mixture, of formaldehyde dimethyl acetal were added continuously to the monomer mixture. The crude polymer obtained was conveyed at the outlet of the polymerization reactor via a drop shaft into a second twin-screw extruder. Unconverted monomers were removed by means of reduced pressure and were absorbed in a water circulation. The amount of monomer separated off per hour was 600 g. In the second twin-screw extruder, the crude polymer was melted and was mixed with a mixture of 46% by weight of Irganox 245 (produced by Ciba Spezialchemie), 31 % by weight of amide wax Hostalub FA, 15% by weight of tricalcium citrate and 8% by weight of dicyandiamide. This mixture was fed to the second extruder at a rate of 15.6 g/h. After passing through the discharge zone, the polymer was taken off as a molten extrudate, cooled in a water bath and then cut to give granules. The granules thus obtained were thoroughly dried and were kept under inert gas at a temperature of 240° C. for several hours to determine the heat stability.

The material obtained is suitable for further use in injection molding or extrusion process and has very good heat stability.

Examples 2–4

The procedure was as in Example 1, the amount of trifluoromethanesulfonic acid being varied (for data, cf. Table 1).

Example 5

A molten monomer mixture comprising 97% by weight of trioxane and 3% by weight of dioxolane was fed at a rate of 3 kg/h to a twin-screw extruder used as a polymerization reactor. 0.1 ppm, based on the monomer mixture, of trifluoromethanesulfonic acid dissolved in 300 ppm, based on the monomer mixture, of formaldehyde dimethyl acetal and a further 850 ppm, based on the monomer mixture, of formaldehyde dimethyl acetal were added continuously to the monomer mixture. The crude polymer obtained was conveyed at the outlet of the polymerization reactor via a drop shaft into a second twin-screw extruder and further processed as in Examples 1–4.

Comparative experiment: A commercial POM copolymer (Hostaform) was also tested as in Example 1 with respect to its heat stability. The result is shown in Table 1.

TABLE 1

| Example | Trifluoromethanesulfonic acid ppm | Heat stability* Weight loss %/h |
|---|---|---|
| 1 | 0.15 | 0.25 |
| 2 | 0.08 | 0.22 |
| 3 | 0.18 | 0.30 |
| 4 | 0.06 | 0.20 |
| 5 | 0.10 | 0.21 |
| Comparison Commercial product | | 0.42 |

*Heat stability measured as rate of weight loss in %/h at a temperature of 240° C. under inert gas.

We claim:

1. A continuous process for the preparation of polyacetal copolymers from 1,3,5-trioxane and the comonomers known for this purpose using strong protic acids as an initiator, in which the initiator is added in an amount of 0.01 to 0.6 ppm, based on the total amount of monomers, in finely divided form to the monomer mixture, after the polymerization step the crude polymer is transferred from the polymerization reactor to a mixing unit without further intermediate steps, excess monomer is removed from the crude polymer in the mixing unit or between polymerization reactor and mixing unit by applying reduced pressure and, if desired, generally customary stabilizers, assistants, fillers, reinforcing materials and/or colorants are incorporated into the polymer in the mixing unit.

2. The process as claimed in claim 1, wherein at least one heteropoly acid, prchloric acid or perfluoroalkanesulfonic acid, or a combination thereof is used as the initiator.

3. The process as claimed in claim 1, wherein the amount of initiator is in the range from 0.03 to 0.4 ppm, based in each case on the monomer mixture.

4. The process as claimed in claim 1, wherein the initiator is added in the form of a solution in a solvent to the monomer mixture.

5. The process as claimed in claim 4, wherein at least one aliphatic or cycloaliphatic ether or one aliphatic or cycloaliphatic acetal is used as the solvent for the initiator.

6. The process as claimed in claim 4, wherein 1,3-dioxolane, 1,6-dioxane or a formaldehyde dialkyl acetal is used as the solvent for the initiator.

7. The process as claimed in claim 4 wherein the weight ratio of initiator to solvent is 1:100 to 1:100,000.

8. The process as claimed in claim 4, wherein formaldehyde dialkyl acetals are used in an amount of 3.4 to 34 mmol per kg of monomer mixture as solvents for the initiator.

9. The process as claimed in claim 1, wherein a twin-screw extruder is used as the polymerization reactor and/or mixing unit.

10. The process as claimed in claim 2 wherein the initiator is trifluoromethanesulphonic acid.

11. The process as claimed in claim 3 wherein the amount of the initiator is in the range of 0.05 to 0.19 ppm, based in each case on the monomer mixture.

12. The process as claimed in claim 6 wherein the solvent for the initiator is formaldehyde dimethyl acetal, formaldehyde dipropyl acetal or formaldehyde dibutyl acetal.

13. The process as in claim 7 wherein the weight ratio of initiator to solvent is 1:500 to 1:10,000.

* * * * *